Patented Apr. 14, 1942

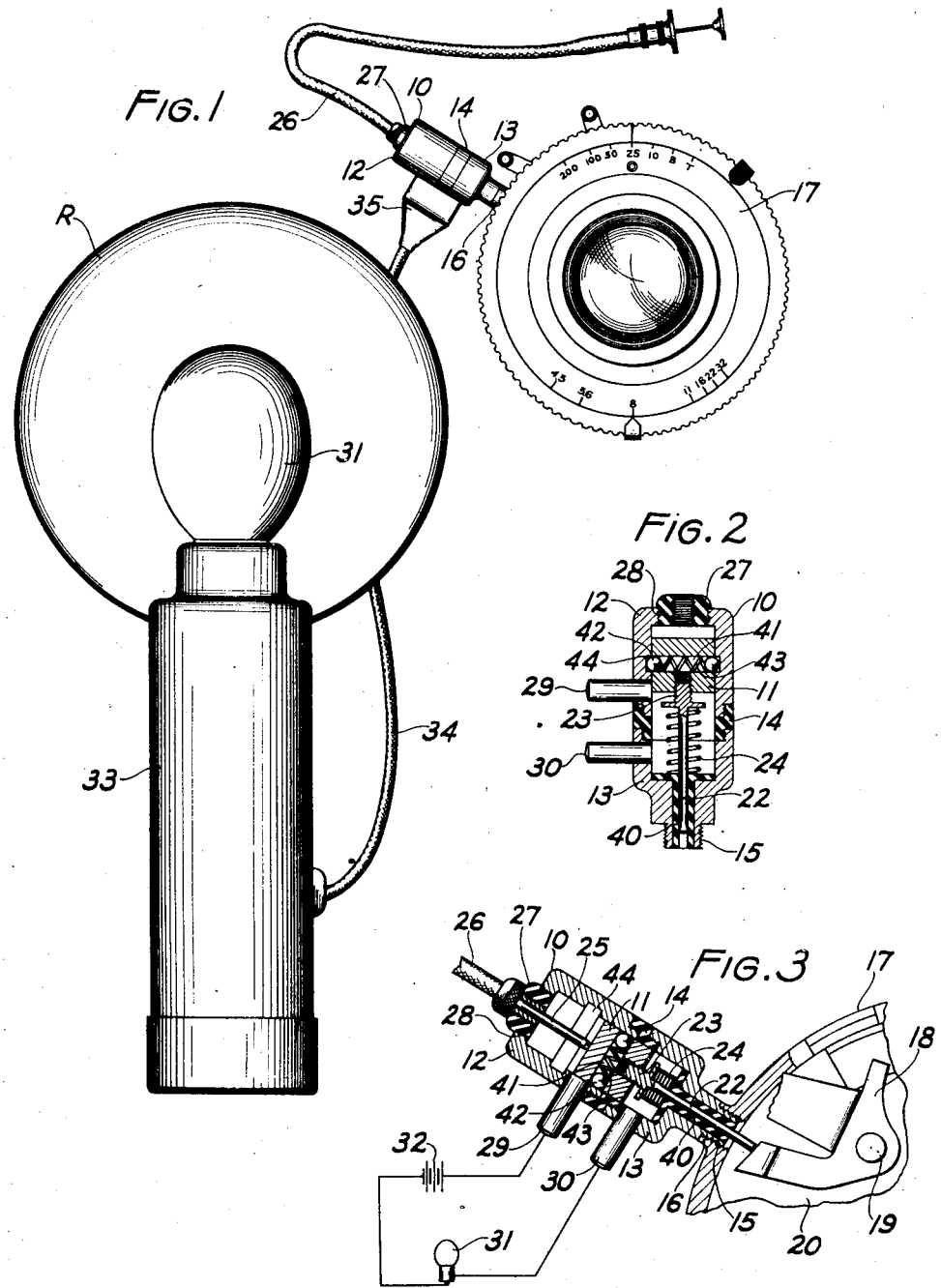

2,279,370

UNITED STATES PATENT OFFICE 2,279,370

FLASHLIGHT SYNCHRONIZING DEVICE

John Warren Gillon, Rochester, N. Y., assignor to Eastman Kodak Company, Rochester, N. Y., a corporation of New Jersey Application September 28, 1940, Serial No. 358,843

9 Claims. (Cl. 67—29)

The present invention relates to flashlight photography, and particularly to a synchronizing device for operating a flashlight and camera shutter in synchronism.

Most flashlight synchronizing devices on the market constitute a circuit controlling switch including normally separated contacts one of which is movable relative to the other to close a lamp circuit in timed relation to the actuation of a camera shutter, the movable contact constituting, or being carried by, the member which operates the shutter. One of these contacts, generally the stationary one, is made adjustable relative to the other so that the synchronizer can be adjusted to give the necessary time delay between the closing of the lamp circuit and the operation of the shutter to insure the lamp being at its full brilliance at the time the shutter is wide open.

Every shutter has a lag, as the time interval between the actual operation of the release member of the shutter and the instant the shutter becomes fully open is known as, and which must be accounted for in flashlight synchronization. Every flash lamp also has a lag, as the time interval between the instant the lamp circuit is closed and the instant the lamp reaches its peak of illumination is known as. Most known flash lamps have a lag of approximately 19 to 20 milliseconds which is much greater than the lag found in any shutter. While the shutter lag may vary depending upon the type and make of shutter under consideration, one make of between-the-lens type of shutter is known to have a lag of approximately 7 milliseconds. Thus if a shutter having a 7 millisecond lag is to be synchronized with a lamp having a lag of 20 milliseconds it will be appreciated that the synchronizing device must be adjusted to close the lamp circuit 13 milliseconds before the shutter is operated. This set of conditions made it mandatory that all known synchronizing devices provide for the closing of the lamp circuit in advance of the operation of the camera shutter. It is to be understood of course that these conditions are of consequence only when the instantaneous exposures are to be taken as distinguished from "time" or "bulb" exposures where the shutter remains open and the duration of the flash determines the time of exposure.

A new type of flash lamp has recently been invented which has a lag equal to that of the lag of certain well-known shutters, as distinguished from a lag much greater than that of such shutters, so that the lamp circuit can be completed simultaneously with the operation of the shutter and perfect synchronization will result. While known flash synchronizers having relatively adjustable contacts can be adjusted so as to effect a simultaneous closing of the lamp circuit and operation of the shutter, these synchronizers necessarily will require an accurate adjusting operation in order to function properly with this new type of lamp and are more complicated so far as structure is concerned than they need be for use with such a lamp. In addition, synchronizers which constitute a circuit controlling switch in themselves generally are so constructed that it is possible to close the lamp circuit without operating the shutter, this condition resulting when one switch contact is moved far enough to engage the other contact but is not moved far enough to actuate the shutter.

Therefore, one object of the present invention is to provide a flashlight synchronizing device for photography which is designed for use with a flash lamp having a lag substantially equal to the lag of the shutter with which it is to be used, and which is constructed so that the shutter is operated simultaneously with the completion of the lamp circuit.

Another object of the present invention is to provide a flashlight synchronizer of the type described which requires no adjustment whatever to effect the desired simultaneous operation of the shutter and completion of the lamp circuit.

A further object is to provide a synchronizer of the type described which need only be detachably mounted on a support in operative relation to a shutter release to become immediately effective without further adjustment so far as synchronization is concerned.

And yet another object is to provide a synchronizing device of the type set forth which is not a circuit controlling switch in itself but includes only one movable switch contact which engages a shutter release member which is the second switch contact to operate the shutter and close the flashlight circuit simultaneously.

A further object is to provide a synchronizer of the type set forth which is provided with means for preventing either the closing of the lamp circuit or the operation of the shutter alone without the operation of the other.

And another object is to provide a flashlight synchronizer including a movable member which constitutes one switch contact adapted to engage another switch contact to close the lamp circuit, and adapted to release a shutter release member when moved over a given path; said synchronizer including means for restraining movement of said movable member until sufficient force is applied thereto to carry it through its entire path of movement so that one function of the movable member cannot be effected without the other.

And still another object is to provide a synchronizer of the type described which is simple in construction, neat in appearance, readily detachably mounted in operative relation to a shutter release member; and ready for operation without further adjustment upon being mounted in operative relation to said release member, and of such nature that its association with a shutter release member does not affect the normal operation of the shutter for ordinary daylight photography.

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawing in which, Fig. 1 is a front elevation showing a flashlight synchronizer constructed in accordance with a preferred embodiment of the present invention and operatively associated with a photographic shutter and an electric circuit including a flash lamp and a source of potential.

Fig. 2 is a vertical section of the flashlight synchronizer per se.

Fig. 3 is a sectional view showing a flashlight synchronizer associated with a photographic shutter, and with the plunger in a circuit closing and shutter operating position; and showing the lamp and potential circuit for said synchronizer diagrammatically.

Like reference characters refer to corresponding parts throughout the drawing.

The flash synchronizer constituting the present invention is adapted for use with a flash lamp having a lag characteristic substantially equal to the lag characteristic of the shutter with which it is to be used so that a simultaneous operation of the shutter and a closing of the lamp circuit will insure the shutter being at a full open position at the instant the lamp reaches its peak of illumination. Therefore, throughout this specification when reference to a flash lamp is made, a lamp having the lag characteristics set forth will be implied.

Broadly speaking, the flash lamp synchronizer of the present invention includes a movable plunger which is adapted when moved manually, or otherwise, to engage and actuate the release member of a shutter. The synchronizer includes means for electrically connecting the lamp circuit thereto so that the plunger becomes one switch contact and the shutter release member becomes the other upon the synchronizer being properly associated with the shutter release. Thus when the plunger is moved to its operative position it engages the shutter release to complete the lamp circuit and at the same time actuate the shutter whereby the two functions are produced simultaneously. To prevent the plunger from being moved only far enough to complete the flash lamp circuit without at the same time releasing the shutter, means are provided for frictionally restraining the plunger from movement toward its operative position until sufficient force is applied thereto to insure its being carried through its full stroke upon release of said restraining means.

Referring now to the drawing, the flash synchronizer constituting the present invention comprises a housing, indicated generally at 10, within which a plunger 11 is adapted to slide between an operative position, see Fig. 3, and an inoperative position, see Fig. 2. For a purpose which will be clearly understood from the following description the housing 10 is composed of two separate metal parts 12 and 13 connected together by an insulating coupling 14 in threaded engagement with each part, as clearly shown in Figs. 2 and 3. The metal part 13 is provided with a threaded tip 15 which is adapted to be screwed into a cable release socket 16 found on most well-known photographic shutters of the type shown and indicated at 17.

The shutter 17 of the type illustrated is well known and forms no part of the present invention per se so that it need not be specifically described. For a full understanding of the present invention it will suffice to say that the shutter includes a member for releasing the same and which member may take the form of a release member 18 pivoted at 19 in the shutter casing 20 to be moved counterclockwise to the position shown in Fig. 3 to release the shutter and to move clockwise under the action of the shutter spring when the shutter is cocked. For the purpose of clearly understanding the electrical hookup of the synchronizer which will be hereinafter described it might be pointed out that the casing of this type of shutter is usually made of metal and the release member thereof is usually in metal to metal contact with said casing through one or more parts of the complete shutter mechanism whereby the casing and release member can be considered to be in electrical contact. If perchance the release member 18 fails to be in electrical contact with the metal shutter casing such a connection could be deliberately provided for as will be readily appreciated by one skilled in the art.

The plunger 11 includes a part which is adapted to extend through the tip 15 and the metal part 13 of the housing to engage and actuate the shutter release 18 when the plunger is moved to its operative position shown in Fig. 3 from its inoperative position shown in Fig. 2. While this shutter release engaging part may be an integral part of the plunger, for the purpose hereinafter set forth, I have chosen to show it as a separate rod 22 having a threaded end adapted to be screwed into the bottom face of the plunger as shown at 23.

The plunger 11 along with the rod 22 connected thereto is normally moved to its inoperative position, see Fig. 2, by a coiled compression spring 24 surrounding the rod and situated between the bottom of the plunger, or a flange on the rod 22 connected thereto, and a shoulder on the metal part 13 of the housing. The plunger 11 is adapted to be manually moved to its operative position by means of a cable 25 of the cable release 26 which is adapted to be detachably connected to a threaded socket 27 in a well-known manner, and which socket is in turn threaded into a threaded opening 28 in the upper end of the metal part 12 of the housing. The threaded socket 27 is preferably made of an insulating material, as shown, to prevent the flash lamp circuit from being accidentally short circuited by a part of the cable release touching the shutter casing.

The housing 10 includes a pair of electrical jacks 29 and 30 which are adapted to be connected to opposite sides of a flash lamp circuit including a flash lamp 31 and a source of potential 32 connected in series. As is well known, this flash lamp circuit may constitute a battery case 33 in a socket in the top of which the lamp may be screwed in front of a reflector R. The battery case 33 may have an extension cord 34 connected thereto and the end of which may be provided with an electric plug 35 adapted to be slipped onto said jacks 29, 30 to connect the same into the flash lamp circuit.

Referring to Figs. 1 and 2, it will be noticed that the jack 29 is electrically connected to the metal part 12 while the jack 30 is electrically connected to the metal part 13. Consequently, the plunger 11 which is in metal-to-metal contact with the part 12 will be electrically connected to one side of the lamp circuit as will be the rod 22 carried thereby whereby the rod 22 will necessarily become one switch contact for the circuit. The other jack 30 is electrically connected to the metal part 13 which in turn upon being screwed into the metal shutter casing will be electrically connected through the casing and shutter mechanism to the shutter release 18 so that the latter member will automatically become the other switch contact upon attachment of the synchronizer to the shutter casing. The rod 22 and the spring 24 are insulated from metal part 13 by an insulating sleeve 40 so that the lamp circuit will not become short circuited. Therefore, since the rod 22 and the shutter release 18 are switch contacts of the lamp circuit, when the same is plugged into the synchronizer it will be readily understood that the lamp circuit will be completed the instant the rod 22 engages the release 18 to operate the shutter whereby the lamp will be ignited and the shutter operated simultaneously.

With known flash synchronizers having a movable member which both closes a switch and actuates the shutter release in timed relation to effect synchronization of the flashing of the lamp and opening of the shutter it is possible to move said member part way through its stroke so as to close the switch and flash the lamp without actuating the shutter. This is particularly true of synchronizers in which there is a considerable time delay, or movement of the actuating member, necessary between the two operations. It would, however, be possible to set off a flash lamp with the present synchronizer without operating the shutter, even though the two have no appreciable time delay between their operations. For example, if the plunger were moved very slowly toward its operative position and stopped just as the tip of the rod 22 engaged the release member without moving it then the lamp circuit would be completed and the shutter would not be operated. Such a condition would make it possible for one to flash the lamp without making the exposure, and although the occurrence would be accidental and infrequent it would be a nuisance which I have overcome in a simple manner as will now be set forth.

So as to make it impossible to move the plunger 11 only far enough to close the lamp circuit without actuating the shutter release I have provided a synchronizer with means for frictionally restraining the movement of the plunger from its inoperative position until sufficient force is applied thereto to insure its being moved to its full operative position by the force applied thereto and necessary to overcome said restraining means. Although a frictional restraining means of this character could take many different forms, as an illustration of one structure which would be suitable I have shown the plunger 11 provided with an opening 41 extending transversely therethrough. In opposite ends of this opening 41 is located a ball 42 having rolling contact with the wall of said opening, and each of these balls is normally spring pressed into contact with the inside wall of the metal part 12 of the housing by a compression spring 43 located in the opening therebetween. These balls are preferably metal so as to improve the electrical connection between the metal part 12 of the housing and the plunger 11, although the sliding fit between the plunger and the metal part could be made tight enough to provide this electrical connection alone.

The inside wall of the metal part 12 of the housing is provided with a groove 44 into which said balls are adapted to snap when the plunger is returned to its inoperative position by the spring 24 to frictionally retain the plunger in this position. It will be noted that the dimensions of the groove 44 relative to the diameter of the balls 42 is such that the balls extend into the grooves by a distance less than the radii thereof so that they do not become a positive lock but will be forced back into said opening against the action of the spring 43 when sufficient downward pressure is applied to the plunger by the cable release. Therefore, through the engagement of the balls with the grooves, the plunger cannot be slowly and smoothly moved from its inoperative position to its operative position. On the contrary, before the plunger will start to move a sufficient force must be applied to the top thereof by the cable release to cause the balls to be forced out of the grooves. When the balls finally do leave the grooves the plunger moves against only the resistance of the spring 24, and since the initial pressure required to release the balls is greater than that required to overcome the spring, the plunger moves quickly through its full stroke without control by the operator handling the cable release.

While the rod 22 could be made an integral part of the plunger 12 and operate in the manner described it is desirable to have the same a separate part as shown for the following reason. The throw necessary in the release member of different types of shutters to release said shutters may vary to a small degree so that the distance the tip of the rod 22 must extend into the shutter to release the same might vary. Offhand it would seem logical that if the rod were made of such length as to accommodate the greatest throw that might be required with any given type of shutter that it would necessarily operate any shutter it might be used on. So far as the release of the shutter is concerned this reasoning would hold, but if a plunger having a rod suitable for a shutter release requiring a long throw were used on a shutter having a release requiring only a short throw then it would follow that an excessive pressure would be applied to the latter shutter release after it reached its stop position which pressure might tend to bend, or otherwise injure, the shutter release or the mechanism connected thereto.

By making the rod 22 separate from the plunger and connecting it thereto in the manner shown it is possible to adjust the throw of the plunger to suit the movement required of the release of any shutter which the device might be used on. For instance, referring to Fig. 3 it will be noticed that when the spring 24 is completely compressed it forms a positive stop for the plunger and determines the extent to which the tip of the rod 22 will extend into the shutter when moved to its operative position. With the plunger in its operative position, if the rod is screwed into or out of the plunger by virtue of the connection 23 the amount the tip thereof extends into the shutter in this position can be varied to suit the shutter with which the device is to be used. The friction between the plunger and the housing may be sufficient to hold the plunger against rotation for adjustment of the rod relative thereto, or a manually operated setscrew or keyway connection between the plunger and housing, not shown, could be provided to hold the plunger against rotation if desired.

While I have shown and described my synchronizer as one which is adapted to be detachably mounted in the cable release socket of a shutter casing, it will be readily understood that the invention is not limited to the precise structure disclosed or the manner of operatively associating it with a shutter release. A synchronizer operating on this principle could be operatively associated with a shutter release located exteriorly of the shutter casing proper, or remote therefrom, as is true of cameras having the shutter release on the camera body remote from the shutter itself, without necessitating a modification which would amount to invention.

In use, the flashlight synchronizer shown in Fig. 2 is screwed into the cable release socket of a shutter casing. The electric plug 35 connected in a lamp circuit is then slipped onto the jacks of the synchronizer whereupon the rod 22 becomes one switch contact by virtue of the metal-to-metal contact between the plunger 11 and the metal part 12 to which one jack 29 is connected, while the shutter release member 18 becomes the second switch contact by virtue of the metal-to-metal contact between the metal part 13 to which the other jack 30 is connected and the metal-to-metal contact between the part 13, the shutter casing 20, and the release member to the shutter mechanism. The plunger and the rod are normally moved to the inoperative position shown in Fig. 2 by the spring 24 so that the switch contacts will be separated. The cable release 26 of well-known construction is attached to the housing in the manner illustrated, and by means of which a downward pressure may be applied to the plunger when an exposure is to be made. After sufficient pressure is applied to the plunger to release the frictional restraining means acting thereon, the plunger and rod move rapidly through their full stroke to the operative position shown in Fig. 3 wherein the flash lamp circuit is closed and the shutter is operated simultaneously. Release of the plunger on the cable release will permit the plunger 11 and the rod 22 connected thereto to return to their inoperative positions in the housing under the action of spring 24 so as to be ready for making a subsequent flash exposure.

From the above description it will be apparent that the present flashlight synchronizer is one of extremely simple construction and one capable of fool-proof operation. Inasmuch as the shutter release is adapted to constitute one switch contact of a flash circuit to be engaged by a movable contact which engages said release to operate the shutter, a simultaneous closing of the lamp circuit and operation of the shutter for synchronization is assured without necessitating any synchronizing adjustment whatsoever. The use of means for frictionally restraining movement of the plunger until a sufficient pressure is built up thereon to move it throughout its stroke insures against moving said plunger only far enough to close the lamp circuit without also operating the shutter.

Although I have shown and described certain specific embodiments of my invention, I am fully aware that many modifications thereof are possible. My invention, therefore, is not to be restricted except insofar as necessitated by the spirit of the appended claims.

Having thus described my invention, what I claim is new and desire to secure by Letters Patent of the United States is:

1. In a flashlight synchronizing device for photography the combination with a shutter having a release member, of a housing, a plunger slidably mounted to move between an inoperative and an operative position in said housing and adapted to engage and actuate said release member when moved to said operative position, means for moving said plunger to said inoperative position, means for moving said plunger to said operative position, an electric circuit including an illuminant and a source of potential, means for electrically connecting one side of said circuit to said plunger and the other side thereof to said release member whereby said circuit is adapted to be completed at the instant said plunger engages said release member, and means for preventing movement of said plunger from its inoperative position until sufficient force is applied thereto to insure its being moved to its operative position thereby.

2. In a flashlight synchronizing device for photography the combination with a shutter having a release member, of a housing, a plunger slidably mounted to move between an inoperative and an operative position in said housing and adapted to engage and actuate said release member when moved to said operative position, means for moving said plunger to said inoperative position, means for moving said plunger to said operative position, an electric circuit including an illuminant and a source of potential, means for electrically connecting one side of said circuit to said plunger and the other side thereof to said release member whereby said circuit is adapted to be completed at the instant said plunger engages said release member, and means for frictionally restraining the movement of said plunger from its inoperative position until sufficient force is applied thereto to insure its being moved to its operative position thereby.

3. In a flashlight synchronizing device for photography the combination with a shutter having a release member, of a housing adapted to be secured to the socket provided on the shutter for a cable release, a plunger slidably mounted in said housing to move between an inoperative and operative positions, said plunger including a part adapted to extend into said shutter and engage and actuate said release member when said plunger is moved to its operative position, and adapted to be retracted from said release member when said plunger is moved to its inoperative position; means normally moving said plunger to said inoperative position, means for moving said plunger to said operative position, an electric circuit including an illuminant and a source of potential, means for detachably electrically connecting one side of said circuit to said part of the plunger moving into and out of said shutter, and the other side thereof to said release member, and means for frictionally holding said plunger in its inoperative position until sufficient force is applied thereto to insure its being moved to its operative position by said force upon release of said holding means.

4. In a flashlight synchronizing device for photography the combination with a shutter having a release member, of a housing adapted to be secured to the socket provided on the shutter for a cable release, a plunger slidably mounted in said housing to move between an inoperative and operative positions, said plunger including a part adapted to extend into said shutter and engage and actuate said release member when said plunger is moved to its operative position, and adapted to be retracted from said release member when said plunger is moved to its inoperative position; means normally moving said plunger to said inoperative position, means for moving said plunger to said operative position, an electric circuit including an illuminant and a source of potential, means for detachably electrically connecting one side of said circuit to said part of the plunger moving into and out of said shutter, and the other side thereof to said release member, whereby said electric circuit is closed simultaneously with the actuation of said release member.

5. In a flashlight synchronizing device for photography the combination with a shutter having a release member, of a housing adapted to be secured to the socket provided on the shutter for a cable release, a plunger slidably mounted in said housing to move between an inoperative and operative positions, said plunger including a rod connected thereto and adapted to extend into said shutter and engage and actuate said release member when said plunger is moved to said operative position, means for adjusting said rod relative to said plunger and in the direction of movement thereof for varying the throw of said rod in accordance with different shutters, means normally moving said plunger to said inoperative position, means for moving said plunger to said operative position, an electric circuit including an illuminant and a source of potential, means for detachably electrically connecting one side of said circuit to said rod and the other side thereof to said release member whereby said circuit is adapted to be completed at the instant said rod engages said release member to actuate said shutter.

6. In a flashlight synchronizing device for photography the combination with a shutter having a release member, of a housing adapted to be secured to the socket provided on the shutter for a cable release, a plunger slidably mounted in said housing to move between an inoperative and operative positions, said plunger including a part adapted to extend into said shutter and engage and actuate said release member when said plunger is moved to its operative position, and adapted to be retracted from said release member when said plunger is moved to its inoperative position; means normally moving said plunger to said inoperative position, means for moving said plunger to said operative position, an electric circuit including an illuminant and a source of potential, means for detachably electrically connecting one side of said circuit to said part of the plunger moving into and out of said shutter, and the other side thereof to said release member, retractable means carried by said plunger adapted to engage a deformation on the inside wall of said housing when said plunger is in its inoperative position to frictionally restrain movement of said plunger from said position.

7. In a flashlight synchronizing device for photography the combination with a shutter having a release member, of a housing adapted to be secured to the socket provided on the shutter for a cable release, a plunger slidably mounted in said housing to move between an inoperative and operative positions, said plunger including a part adapted to extend into said shutter and engage and actuate said release member when said plunger is moved to its operative position, and adapted to be retracted from said release member when said plunger is moved to its inoperative position; means normally moving said plunger to said inoperative position, means for moving said plunger to said operative position, an electric circuit including an illuminant and a source of potential, means for detachably electrically connecting one side of said circuit to said part of the plunger moving into and out of said shutter, and the other side thereof to said release member, a ball seated in a recess in the exterior of said plunger and normally spring pressed outwardly against the inside wall of said housing, said ball adapted to engage a deformation provided on the inside wall of said housing when the plunger is in its inoperative position to frictionally restrain movement of said plunger from said position.

8. In a flashlight synchronizing device for photography the combination with a shutter having a release member, of a housing adapted to be secured to the socket provided on the shutter for a cable release, a plunger slidably mounted in said housing to move between an inoperative and operative positions, said plunger including a part adapted to extend into said shutter and engage and actuate said release member when said plunger is moved to its operative position, and adapted to be retracted from said release member when said plunger is moved to its inoperative position; means normally moving said plunger to said inoperative position, means for moving said plunger to said operative position, an electric circuit including an illuminant and a source of potential, means for detachably electrically connecting one side of said circuit to said part of the plunger moving into and out of said shutter, and the other side thereof to said release member, and means for frictionally holding said plunger in its inoperative position until sufficient force is applied thereto to insure its being moved to its operative position by said force upon release of said holding means, said means including a groove provided around the inside wall of said housing, an aperture through said plunger, a pair of balls located in said aperture, a spring located in said aperture between said balls and normally forcing said balls against the inside wall of said housing whereby they are adapted to seat in said groove when the plunger is moved to said inoperative position.

9. A flashlight synchronizing device for use with a shutter including a metal casing and a release member within said casing and electrically connected thereto, and comprising a housing including a metal part adapted to be detachably secured in the socket in the shutter provided for a cable release, a second metal part connected to, and insulated from, said first metal part by an insulating member, a plunger slidably mounted in said housing to move between an operative and an inoperative position therein, said plunger including a projection adapted to extend into said shutter to engage and actuate said release member and be retracted from said casing when said plunger is moved between said two positions respectively, means normally moving said plunger to said inoperative position, means for moving said plunger to said operative position, means for electrically connecting opposite sides of an electric circuit including an illuminant and a source of potential to each of said metal parts, and means between said plunger and said housing for frictionally restraining said plunger in said inoperative position against movement toward said operative position until sufficient force is applied to said plunger to insure its being moved to said operative position by said force upon the release of said restraining means.

JOHN WARREN GILLON.